United States Patent [19]
Barzegar et al.

[11] Patent Number: 5,894,478
[45] Date of Patent: Apr. 13, 1999

[54] PROTOCOL CONVERTER AND ROUTER FOR MULTI-MODE WIRELESS DATA COMMUNICATIONS

[75] Inventors: Farhad Barzegar, Hillsborough; Chi-Hwey Chang, Lincoln Park; Albert Chow, Hillsdale; Gregory M. Durant, Plainfield; Danny K. Hsu, Morristown; Xiaojian Huang, Somerset; Jesse Eugene Russell, Piscataway; Robert Edward Schroeder, Morris, all of N.J.

[73] Assignee: Lucent Technologies Inc., Murray Hill, N.J.

[21] Appl. No.: 08/690,269

[22] Filed: Jul. 24, 1996

[51] Int. Cl.⁶ .................. H04J 3/22; H04J 3/16

[52] U.S. Cl. ........................... 370/401; 370/466

[58] Field of Search .................. 370/400, 401, 370/402, 405, 406, 464, 465, 466, 389, 404, 408, 407, 467, 469; 455/33.1

[56] References Cited

U.S. PATENT DOCUMENTS 5,428,771  6/1995  Daniels et al. ............... 370/466
5,471,471  11/1995  Freeburg et al. ............. 370/466
5,608,720  3/1997  Biegel et al. ................. 370/249

*Primary Examiner*—Dang Ton

[57] ABSTRACT

The present invention encompasses an apparatus and method for supporting multiple wireless data communication networks between a wireless communications device and a fixed communications device or another wireless communications device. Two network elements compose the physical apparatus, a protocol converter and a router. Upon receiving packet data from a fixed communications device, a router will locate a destination wireless communications device. The router will then convert the packet data to a format usable by the wireless data network that the wireless communications device is currently using for wireless access. After conversion, the router will perform actual transmission of the packet data to the correct destination wireless network. Once the converted packet data is received by the wireless network base station, it will be transmitted via RF to the destination wireless communications device. The router will also perform reverse functions of receiving packet data from a wireless communications device across wireless data network and then perform necessary conversion to a format usable by fixed communications device. The router will then perform actual transmission of the converted packet data to the fixed communications device.

35 Claims, 2 Drawing Sheets

PROTOCOL CONVERTER AND ROUTER FOR MULTI-MODE WIRELESS DATA COMMUNICATIONS

RELATED APPLICATIONS

The present patent application is related to U.S. patent application Ser. No. 08/664,609, entitled Mobile Decision Methodology For Accessing Multiple Wireless Data Networks, having a filing date of Jun. 18, 1996, that application having a one or more common inventors and being incorporated herein by reference.

FIELD OF THE INVENTION

This invention relates to the field of wireless commnunications, and more particularly to the field of mobile communications over multiple wireless data networks.

BACKGROUND OF THE INVENTION

Presently, a wireless communications device user is limited by the single wireless data network the wireless communications device of the user will support. For example, when traveling outside of radio frequency coverage for a specific wireless data network, the user is normally left with no viable alternative wireless communications means. A similar problem occurs during busy traffic hours when the single wireless data network cannot accomodate any more users. Also a wireless communications device user currently cannot communicate with a fixed communications device of a different network or another wireless communications device that is using a different wireless data network interface protocol. Thus a mobile end user is limited to communicating with other users having the same wireless data network interface protocol that the mobile end user is currently utilizing. Therefore, the moving end user can effectively be isolated from users on different data networks. Accordingly, there is a need to provide a seamless data communications system providing wireless communications devices the ability to operate across multiple wireless data networks.

SUMMARY OF THE INVENTION

The present invention encompasses an apparatus and method for supporting multiple wireless data communications between a wireless communications device and another fixed or wireless communications device utilizing different network protocols. Two network elements comprise the physical apparatus. At a wireless network, the wireless communications device utilizes a protocol converter for converting incoming messages from a given network protocol to a network protocol usable by an end processor in the wireless communications device. For messages out bound from the wireless device, the protocol converter converts from the network protocol of the end processor to a network protocol of the network that will be utilized to communicate with a fixed communications device. Conversion between different protocols entails extracting user data from the incoming data message frame and placing the data into a network frame usable by the destination network protocol. The protocol converter also transmits the converted data messages between the end processor and appropriate radio frequency modems.

At a fixed network side, the fixed communications device is coupled to a router interconnected to networks adapted for communications with the wireless communications device. The router converts incoming data messages from a network protocol used by the wireless communications device to the network protocol used by the fixed communications device and also routes the data messages from the receiving network to the fixed communications device. Conversion between different network protocols entails extracting user data from one network data message frame and placing user data into a network frame usable by the destination network. The router also transmits the converted user data to the fixed communications device.

BRIEF DESCRIPTION OF THE DRAWINGS

A more complete understanding of the present invention may be obtained from consideration of the following description in conjunction with the drawings in which.

DETAILED DESCRIPTION

Presently, a mobile enduser cannot normally communicate over more than one wireless data network. For example, a cellular digital packet data (CDPD) user may be forced to only communicate over the CDPD wireless data network and is therefore isolated from other users of a different communication network. The present invention addresses this limitation by allowing mobile end-users the flexibility to choose from a plurality of different wireless data networks to perform wireless communications.

The present invention facilitates communication over a plurality of different wireless data networks by performing necessary protocol conversion of data messages out-bound from a wireless communications device to a format usable by an air-interface protocol of a selected wireless data network; performing necessary protocol conversion of data messages in-bound to the wireless communications device from the selected wireless data network to a format usable by the end-processor of the mobile-end device; and performing routing of data messages to the end-processor if in-bound messages are being received, or to the network RF modem for radio transmission to the selected wireless data network if out-bound messages are being transmitted.

Figure 1:
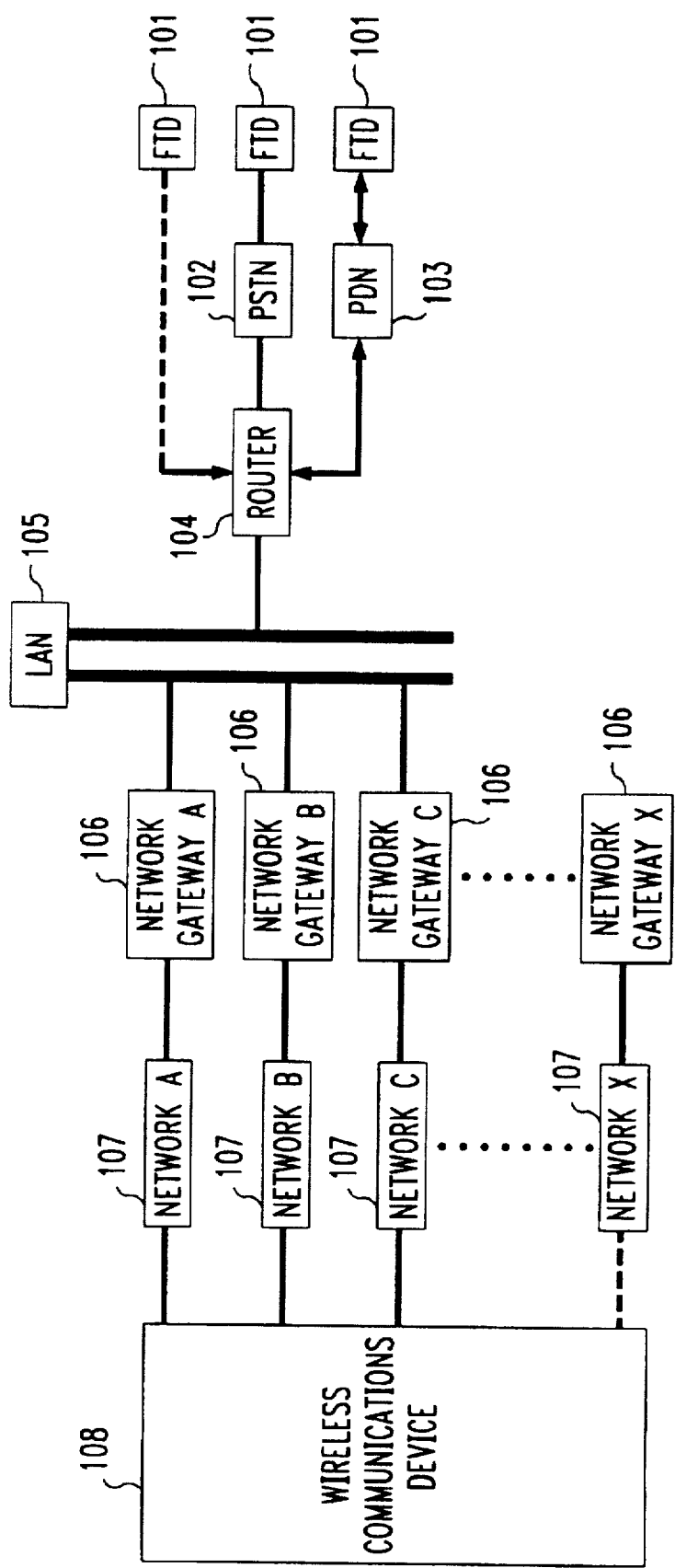
FIG. 1 is a block diagram showing an exemplary system architecture in an end-to-end multiple network wireless data communications system according to the present invention.

The overall system architecture for facilitating wireless data communications across multiple networks is shown in FIG. 1. At the fixed network side, a fixed communications device (FTD) 101 is wired to a router 104. As would be understood, a plurality of wired connection options exist for connecting the fixed communications device with the router. FIG. 1 shows an example of using a Public Switched Telephone Network (PSTN) connection with an Integrated Services Digital Network (ISDN) interface. The wired connection between both the PSTN 102 and the fixed communications device 101 and the router 104 and PSTN 102 comprises an ISDN basic rate interface line (B-channel) whose operation and structure is well known to those skilled in the art and, therefore, the operation and structure thereof need not be described in detail. A fixed communications device comprises any communications device that is not mobile.

At the wireless network side a wireless communications device 108 is capable of transmitting across several networks A, B, C to X (107) usable by the wireless communications device 108. The networks 107 are coupled to associated network gateways A, B, C to X (106) which convert the wirelessly transmitted information from device 108 to protocols used by the local area network 105 (LAN). The LAN 105 is interconnected to the wired network including the fixed communications device 101.

Figure 2:
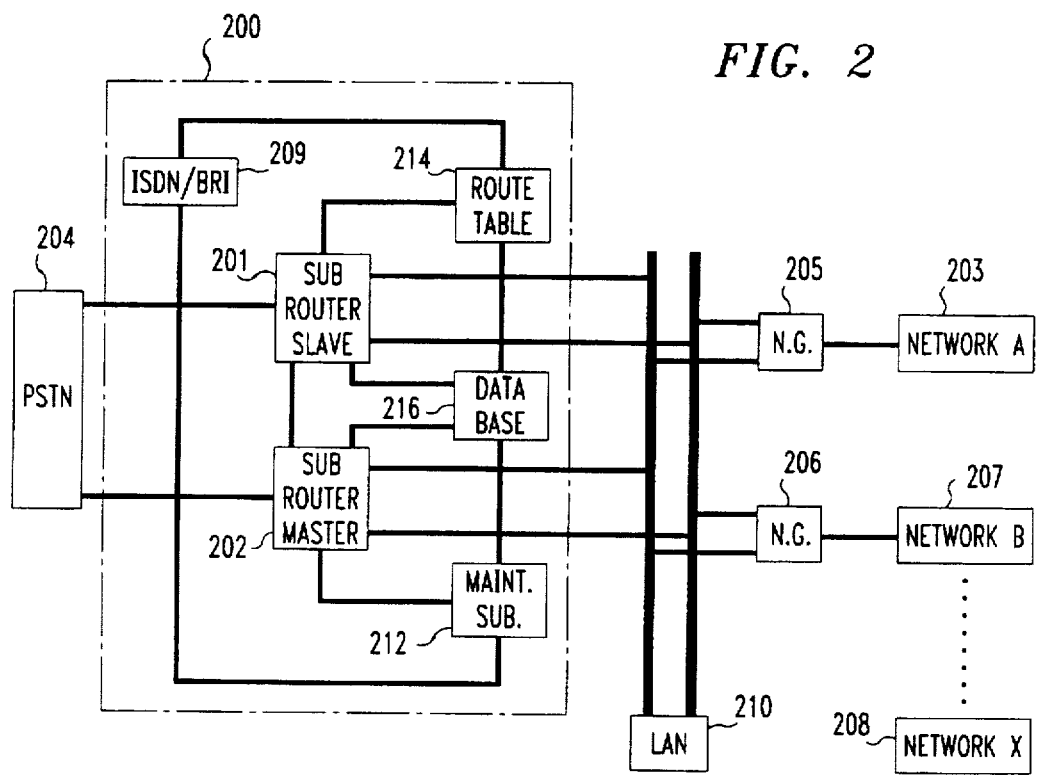
FIG. 2 is a block diagram showing an exemplary internal structure of a router in accordance with the present invention.

The router architecture 200 as shown in FIG. 2 comprises two sub-routers, a master 202 and a slave 201, which both perform the dual function of converting and routing data messages across multiple wireless data networks. The sub-routers 201 and 202 are coupled to the fixed communications network shown as a PSTN 204 and coupled to the local area network 210 which is interconnected to the network gateways 205, 206. The network gateways 205, 206 convert information from the protocols used by the fixed network, such as the PSTN, to protocols used by the wireless networks 203, 207, 208 which carry wireless transmissions to and from the wireless communications device. The router is shown with a basic rate interface 209 to the PSTN network side. Data messages in-bound from a wireless communications device across the multiple wireless data networks will be converted by the router from the wireless data network protocol, if necessary, to the wireless data network protocol usable by a fixed communications device. After conversion, the router will route the data message to the network address of the fixed communications device.

A data message out-bound from the fixed communications device across multiple wireless data networks will be converted (if necessary) by the router from the network protocol used by the network containing the fixed communications device to the wireless data network protocol usable by the destination wireless communications device. After conversion, the router will route the data message through a network gateway 205,206 to the network address of a destination wireless communications device. The router further includes a maintenance subsystem 212 for performing fault recovery, redundancy, traffic measurement, and diagnostics. If any system fault occurs within one of the sub-routers, traffic can be automatically diverted to the other sub-router. A current routing table 214 is maintained and routinely updated when the network address changes for any message received from the network 203, 207, 208.

Once it is determined which network 203, 207, 208 a data message came from, the routing table 214 is updated. Any new message sent to the network is routed using the correct message format and to the correct address by retrieving the receiver's location from the routing table. A mobile database 216 is maintained for every active wireless communications device by storing a user profile for every active mobile user. Every message received by the router 200 is monitored (through user data received) to determine if it is the correct message type and any invalid message types are discarded. All messages received by the router are authenticated by monitoring a user identification (ID) and a source network address in the data message. Once received by the appropriate destination network control center (not shown), the data message will be routed through a destination network to a destination base station where the wireless communications device is currently being provided wireless access and/or registered. At the base station, the data message is transmitted via radio frequency (RF) transmission to a wireless communication device and received by the protocol converter of the wireless communications device in accordance with the present invention.

Figure 3:
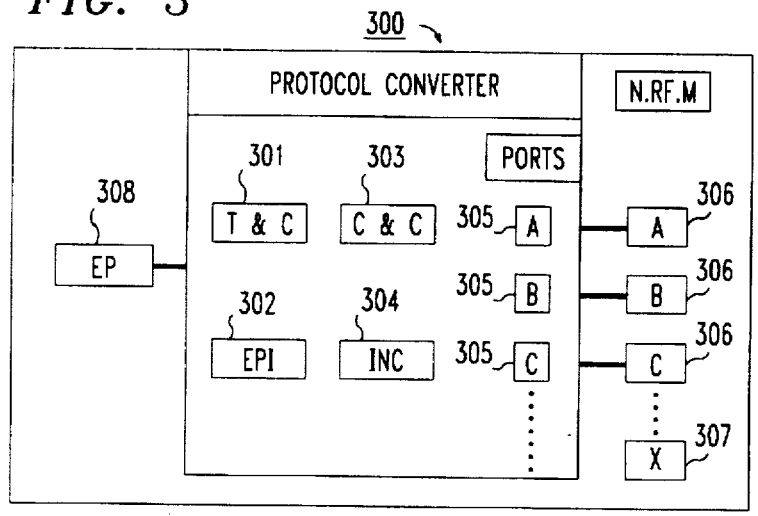
FIG. 3 is a block diagram showing an exemplary internal structure of a protocol converter in accordance with the present invention.

The internal system architecture of the protocol converter 300 associated with a wireless device is shown in FIG. 3. The functional blocks of the protocol converter 300 include timing and control (T&C) 301, end processor interface (EPI) 302, configuration and control (C&C) 303, and inter network control (INC) 304, the implementation of which functions would be understood by a person skilled in the art. Internal ports A, B, and C (305) provide interface connections to network radio frequency modems (NRFM) A, B, and C (306). The protocol converter includes a corresponding number of ports for X number of NRFMs 307. The EPI provides interface connection to the end processor (EP) 308 of the wireless communications device.

At the wireless communications device, the data message is received via one of a plurality of different network RF modems 306 that the wireless communications device is currently utilizing for wireless communications. The plurality of different network RF modems 306 are connected to the protocol converter 300 which performs functions similar to the router on the network side. The protocol converter 300 performs the dual function of: 1) converting in-bound and out-bound data messages to the requested wireless data network protocol and, 2) routing the converted data message. A message out-bound from the wireless communications device is converted by the protocol converter from the network protocol usable by the end processor 308 of the wireless communications device to the requested network air-interface protocol to be used for wireless communications. The converted out-bound message is then routed by the protocol converter to the requested one of a plurality of different wireless network RF modems 306 where it is transmitted via RF to the network base station of the requested wireless data network. An in-bound message received from a requested one of a plurality of different wireless network RF modems is converted by the protocol converter from the requested wireless network air-interface protocol to the network protocol usable by the end-processor of the wireless communications device. The protocol converter-then routes the converted data message to the end processor 308 of the wireless communications device.

The preferred operation of the invention is typified by an example consisting of an automatic train control system (ATCS) fixed communications device and an ATCS wireless communications device currently using the CDPD air-interface network protocol for wireless access. The operation and structure of the elements of a CDPD and ATCS system are well known to those skilled in the art and thus will not be described in great detail.

Beginning with a mobile terminated example and referring again to FIG. 2, the fixed communications device routes an ATCS data message to the router 200 via the ISDN (B-channel) basic rate interface (BRI) interface 208. The data message comprises multiple Open System Integration (OSI) layers in which layer 1 is the physical layer where bits are moved across some medium. Once the message is received by the router 200, its user data and header information (i.e., source and destination address, user ID, timestamp, message type, etc.) is checked to ensure accurate and authenticated transmission. Any message error will be reported to the router maintenance subsystem 212. Routing table 214 and mobile database 216 will be used as a reference to change the ATCS data message to correct destination network format and route the data message to a correct destination address of an active mobile user. The mobile database 216 holds the user profile for every active mobile user. The routing table 214 holds the source network information for a received data message via the network gateway. From these tables, the correct message format and destination address for all out-bound messages can be found and then implemented by the router.

Figure 4:
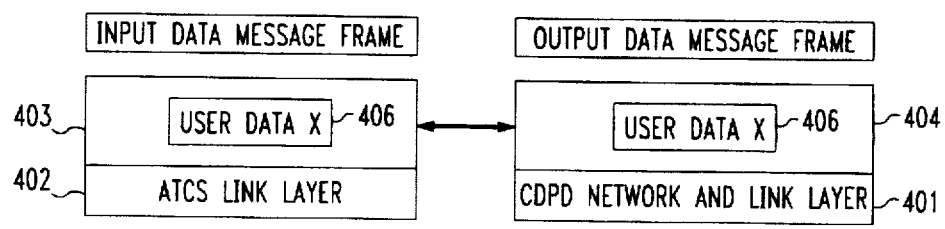
FIG. 4 is a diagram showing the fundamental protocol conversion process according to the present invention.

For a fixed communications device initiated data transmission, as shown in FIG. 4, the user data 406 will be extracted from the ATCS frame 403 and put into a CDPD frame 404 that has the necessary CDPD network information 401. The converted CDPD data message is then routed through a CDPD gateway to a home CDPD network control center for the wireless communications device. At a home Mobile Data Intermediate System (MD-IS), the CDPD data packet is routed to a Mobil Data Base Station (MDBS) where the des tination wireless communications device is currently registered. Once received at the MDBS, the CDPD data packet is transmitted via RF to a CDPD RF modem present in the wireless communications device. Once received by the CDPD RF modem, the data packet is again converted to an ATCS data packet usable by the end processor and routed by way of wired connection to the end processor. The conversion process is also performed by the protocol converter in accordance with FIG. 4. The protocol converter extracts the user data 406 from the CDPD frame 404 and places the user data 406 into an ATCS frame 403 that has necessary ATCS network information 402.

The process is reversed in the opposite direction for a mobile-originated wireless data transmission. The end-processor routes the ATCS data message to the protocol converter. Since protocol conversion is needed, the user data is extracted by the protocol converter from the ATCS frame and put into a CDPD frame that has necessary CDPD network information. The CDPD frame is then routed by the protocol converter to the CDPD RF modem where it is radio transmitted to the network MDBS the wireless communications device is currently using for wireless access. Data packets will then be routed to the network MD-IS and then to the router. At the router, the data packets will again be monitored to ensure authenticated and correct data transmission (i.e., source and destination address, user ID, message type, time stamp, etc.). Any message error will be reported to router maintenance subsystem. Once authenticated, user data 406 will be extracted by the router from the CDPD frame 404 and placed into an ATCS frame 403 with necessary ATCS network information 402.

Although the invention is described here by using an ATCS-CDPD description, it is clear that it is not limited in scope to these two wireless data networks, but can be applied to a plurality of wireless data networks to enable wireless data communications across a plurality of wireless data network protocols irrespective of the wireless protocol usable by the fixed communications device or the end processor of the wireless communications device. Also, although the invention is described here by using a fixed-to-moving end description, it is clear that it is not limited in scope to wireless communications between a moving end user and a fixed communications device, but can also be applied to communications between two or more moving end users.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed:

1. A method for enabling wireless data communications across a plurality of wireless data networks between at least one wireless communications device and at least one second communications device, said method comprising the steps of:

converting out-bound data messages of said wireless communications device by means of a protocol converter to a network protocol of one of said plurality of wireless data networks presently used by said wireless communications device for transmitting to said second communications device;

transmitting from said protocol converter said out-bound data messages of said wireless communications device to said one of said plurality of wireless networks presently used by said wireless communications device;

converting in-bound data messages to said wireless communications device by means of said protocol converter to said network protocol presently used by said wireless communications device; and transmitting said in-bound data messages from said protocol converter to said wireless communications device.

2. The method according to claim 1, further including the steps of:

converting out-bound data messages of said second communications device by means of at least one router to a network protocol presently used by said wireless communications device;

transmitting said out-bound data messages of said second communications device from said router to said one of said plurality of wireless data networks presently used by said wireless communications device;

converting in-bound data messages to said second communications device by means of said router to a network protocol presently used by said second communications device; and transmitting said in-bound data messages from said router to said second communications device.

3. The method according to claim 1, wherein said wireless communications device includes an end processor adapted to utilize the network protocol used by said wireless communications device and being adapted to couple to said protocol converter, said protocol converter further being coupled to a plurality of network radio frequency modems; further including the steps of:

transmitting from said plurality of network radio frequency modems said out-bound data messages of said wireless communications device and receiving said in-bound data messages from one of said plurality of wireless data networks.

4. The method according to claim 2, wherein said step of transmitting said outbound data messages of said second communications device from said router includes the step of transmitting said out-bound data messages to a network control center of said one of said plurality of wireless data networks presently used by said wireless communications device, and transmitting said out-bound data messages of said second communications device to said wireless communications device.

5. The method according to claim 4, further including performing at said router the steps of:

extracting user data from a network data message frame of said in-bound data messages to said second communications device, the extracted user data being placed into a network frame of converted user data used by said second communications device, transmitting the converted user data to said second communications device;

extracting user data from a network data message frame of said out-bound data messages of said second communications device, the extracted user data being placed into a network frame of converted user data being used by a destination network of one of said plurality of wireless data networks presently used by said wireless communications device; and transmitting the converted user data to said network control center of said network presently used by said wireless communications device.

6. The method according to claim 3, further including performing at said protocol converter the steps of:

extracting user data from a network data message frame of said in-bound data messages to said wireless communications device, the extracted user data being placed into a network frame of converted user data usable by said end processor of said wireless communications device, transmitting the converted user data to said end processor of said wireless communications device;

extracting user data from a network data message frame of said out-bound data messages of said wireless communications device, the extracted user data being placed into a network frame of converted user data usable by one of said plurality of wireless data networks presently used by said wireless communications device for transmitting to said second communications device; and transmitting the converted user data to said one of said plurality of wireless data networks being presently by said second communications device for transmitting to said second communications device.

7. The method according to claim 4, further including performing at said router the steps of:

determining from which of said plurality of wireless data networks that data messages are being received by performing at least one of the steps of:

monitoring network information in a data message frame in-bound from said wireless communications device; and monitoring of network address information in said data message frame in-bound to said second communications device; and updating a routing table including a current storage of from which of said plurality of wireless data networks said in-bound data messages to said second communications device are being received, and including a current storage of network addresses of said plurality of wireless data networks usable by said wireless communications device;

converting said out-bound data message of said second communications device to a correct format usable by said network control center and usable by said wireless communications device based on network information from said routing table containing said network protocol usable by said network control center; and transmitting said out-bound data message of said second communications device to a network address of said network control center.

8. The method according to claim 1, further including:

maintaining a mobility database of a currently active plurality of wireless communications devices; and, authenticating data messages incoming from said plurality of wireless communications devices by routinely referencing said mobility database.

9. The method according to claim 8, wherein said step of authenticating includes monitoring a user profile in data messages received from said currently active plurality of said wireless communications devices and comparing said profile to a stored user profile in said mobility database.

10. The method according to claim 2, further including the step of performing data packet filtering at said router including authentication and registration of in-bound data messages of said wireless communications device based upon a user identification and network addresses in a data message frame, and reporting and storing authentication errors to a local maintenance subsystem.

11. The method according to claim 10, further including the steps of processing for error detection at said router based on received data message; correcting processing for given message types; and detecting and discarding any messages being an invalid message type based on user data.

12. The method of claim 2, wherein said router farther includes a maintenance subsystem for performing fault recovery and redundancy including a provision for a redundant router for routing said data message in-bound and said data message out bound and switching traffic from one router to another router when said one said router encounters an unrecoverable system fault.

13. The method according to claim 12, wherein said maintenance subsystem performs traffic volume control including the steps of:

measuring and recording of said out-bound data messages and said in-bound data messages per unit time;

categorizing said in-bound data messages and said out bound data messages based on message type and destination address, determining traffic allocation among a main router and an alternate router using said measurements; and performing diagnostic tests on all primary software and hardware functions.

14. The method according to claim 4, wherein said protocol converter further includes a provision for a wired interface between said end processor and said plurality of network radio frequency modems for every one of said plurality of wireless data networks supported by said wireless communications device.

15. The method according to claim 1, wherein the plurality of wireless communications devices use different air interface protocols.

16. The method of claim 15, wherein the second communication devices include a plurality of fixed communications devices being connected to different routers.

17. The method of claim 4, wherein the network protocol for said end processor is an automatic train control system, the network protocol of one of said plurality of wireless data networks is cellular digital packet data, and the network protocol of said second communications device is said automatic train control system.

18. The method according to claim 1, wherein said second communications device is another said wireless communications device.

19. A system to enable wireless communications across a plurality of wireless data networks between at least one wireless communications device and at least one second communications device, said system comprising:

a protocol converter coupled between said wireless communications device and said second communications device, said protocol converter including:

a converter operable to convert out-bound data messages of said wireless communications device from a given network protocol being used by an end processor of said wireless communication device to converted data messages of a given network air interface protocol;

a transmitter operable to route the converted data messages to a given one of a plurality of network radio frequency modems for wireless transmission across a given one of said plurality of wireless data networks;

said converter further being operable to convert in-bound data messages to said wireless communications device to converted data messages from a given one of said plurality of network radio frequency modems and from said given network air interface protocol to said given network protocol for wireless reception; and said transmitter operable to route the converted data messages to said end processor, wherein said plurality of network radio frequency modems transmit and receive said data messages across said plurality of wireless data networks.

20. The system according to claim 19, further including a router coupled between said second communications device and said plurality of wireless data networks, said router including:

a converter operable to convert in-bound data messages to converted data messages to said second communications device from a network data protocol being used by a given one of said plurality of wireless data networks to a network protocol being used by a destination network including said second communications device, a transmitter for routing the converted data messages to a network address for said second communications device;

said converter operable to convert out-bound data messages of said second communications device from a data network protocol being used by a destination network of said second communications device to converted data messages of a network data protocol being used by a given one of said plurality of wireless data networks, said transmitter operable to route the converted data messages to a network address for said wireless communications device.

21. The system according to claim 19, wherein said protocol converter is further operable to extract user data from a network data message frame of said in-bound data messages of said second communications, place the extracted user data into a network frame of converted user data being used by said end processor of said wireless communications device, and transmit the converted user data to said end processor of said wireless communications device; and, said protocol converter being further operable to extract user data from a network data message frame of said out-bound data messages of said wireless communications device, place the extracted user data into a network frame of converted user data being used by one of said plurality of wireless data networks usable by said wireless communications device for transmitting to said second communications device and transmit the converted user data to said one of said plurality of wireless data networks being used by said wireless communications device for transmitting to said second communications device.

22. The system according to claim 20, wherein said router is further operable to extract user data from a network data message frame of said in-bound data messages to said second communications device, place the extracted user data into a network frame of converted user data being used by said second communications device; and transmit the converted user data to said second communications device; and said router being further operable to extract user data from a network data message frame of said out-bound data messages of said second communications device, place the extracted user data into a network frame of converted user data being used by said destination network of one of said plurality of wireless data networks being used by said wireless communications device, and transmit the converted user data to a network control center of one of said plurality of wireless data networks being used by said wireless communications device.

23. The system according to claim 20, wherein said router further includes:

means for determining from which one of said plurality of wireless data networks usable by said wireless communications device data messages are being received, said means for determining operable to monitor network information in an in-bound data message frame of said wireless communications device and monitor network address information in an in-bound data message frame to said second communications device;

a routing table including a current storage of from which of said plurality of wireless data networks said in-bound data messages of said wireless communications device are being received, and a current storage of network addresses of said plurality of wireless data networks usable by said wireless communications device;

said converter operable to convert said out-bound data message of said second communications device to a correct format usable by a network control center of one of said plurality of wireless data networks being used by said wireless communications device based on network information from said routing table containing the network protocol being used by said network control center; and said transmitter operable to transmit said out-bound data message of said second communications device to a network address of said network control center.

24. The system according to claim 19, wherein said router includes:

a mobility database of currently active plurality of said wireless communications devices, wherein data messages incoming from said plurality of wireless communications devices are authenticated by routinely using said mobility database.

25. The system according to claim 24, further including means for monitoring a user profile in data messages received from said currently active plurality of said wireless communications devices and comparing said user profile to a stored user profile in said mobility database to thereby provide authentication.

26. The according to claim 20, wherein said router further includes means for authentication and registration of in-bound data messages to said second communications device based upon a user identification and network addresses in a data message frame, and means for reporting and storing authentication errors to a local maintenance subsystem.

27. The system according to claim 26, wherein said router further includes means for processing for error detection based on a received data message; correction processing means for predetermined message types; and means for detecting and discarding any messages being an invalid message type based on user data.

28. The system according to claim 20, wherein said router further includes a maintenance subsystem for performing fault recovery and redundancy including a provision for a redundant router for routing said data message in-bound and said data message out bound and switching traffic from one said router to another said router when said one said router encounters an unrecoverable system fault.

29. The system according to claim 28, wherein said maintenance subsystem further includes means for performing traffic volume control including:

means for measuring and recording of said out-bound data messages and said in-bound data messages per unit time;

means for categorizing said in-bound data messages and said out bound data messages based on message type and destination address, means for determining traffic allocation among a main router and an alternate router using said measurements; and, means for performing diagnostic tests on all primary software and hardware functions.

30. The system according to claim 19, wherein said protocol converter further includes a provision for a wired interface between said end processor and said plurality of network radio frequency modems for every one of said plurality of wireless data networks supported by said wireless communications device.

31. The system according to claim 19, wherein said at least one wireless communications devices are adapted to use different air interface protocols.

32. The system according to claim 31, wherein a plurality of fixed communications devices are connected to different routers.

33. The system according to claim 19, wherein said second communications device is another said wireless communications device.

34. An apparatus to enable wireless communications across a plurality of wireless data networks between at least one wireless communications device and at least one second communications device, said apparatus comprising at least one router device, said router device including:

a converter operable to convert in-bound data messages to converted data messages to said second communications device from a network data protocol being used by a given one of said plurality of wireless data networks to a network protocol being used by a destination network including said second communications device, a transmitter for routing the converted data messages to a network address for said second communications device;

said converter operable to convert out-bound data messages of said second communications device from a data network protocol being used by a destination network of said second communications device to converted data messages of a network data protocol being used by a given one of said plurality of wireless data networks, said transmitter operable to route the converted data messages to a network address for said wireless communications device.

35. The apparatus according to claim 34, wherein said router is further operable to extract user data from a network data message frame of said in-bound data messages to said second communications device, place the extracted user data into a network frame of converted user data being used by said second communications device; and transmit the converted user data to said second communications device; and, said router being further operable to extract user data from a network data message frame of said out-bound data messages of said second communications device, place the extracted user data into a network frame of converted user data being used by said destination network of one of said plurality of wireless data networks being used by said wireless communications device, and transmit the converted user data to said network control center of one of said plurality of wireless data networks being used by said wireless communications device.

* * * * *